United States Patent [19]

Oppenlaender et al.

[11] Patent Number: 5,213,585
[45] Date of Patent: May 25, 1993

[54] ALKOXYLATED POLYETHERDIAMINES PREPARATION THEREOF, AND GASOLINES CONTAINING SAME

[75] Inventors: Knut Oppenlaender, Ludwigshafen; Juergen Mohr, Gruenstadt; Roland Schwen, Friedelsheim; Juergen Thomas, Fussgoenheim, all of Fed. Rep. of Germany

[73] Assignee: BASF Aktiengesellschaft, Ludwigshafen, Fed. Rep. of Germany

[21] Appl. No.: 801,214

[22] Filed: Dec. 2, 1991

[30] Foreign Application Priority Data

Dec. 6, 1990 [DE] Fed. Rep. of Germany ....... 4038913

[51] Int. Cl.⁵ .............................................. C10L 1/22
[52] U.S. Cl. ........................................ 44/433; 44/434
[58] Field of Search ................ 44/433, 432, 434, 446; 564/505; 252/548, 544, 51.5 R

[56] References Cited

U.S. PATENT DOCUMENTS

| | | | |
|---|---|---|---|
| 2,902,354 | 9/1959 | Giammaria | 44/433 |
| 3,309,182 | 3/1967 | Crowley et al. | 44/433 |
| 4,252,745 | 2/1981 | Kwong et al. | 564/505 |
| 4,252,746 | 2/1981 | Kwong | 44/433 |
| 4,417,075 | 11/1983 | Stogryn | 564/505 |
| 4,681,694 | 7/1987 | Zoleski et al. | 252/51.5 R |
| 4,704,217 | 11/1987 | Sweeney et al. | 252/51.5 R |

FOREIGN PATENT DOCUMENTS 0310875  4/1989  Fed. Rep. of Germany .

OTHER PUBLICATIONS

Additive fur kraftstoffe, Rossenbeck, 223-229, G. Thieme Verlag, Stuttgart (1978).

Primary Examiner—Prince Willis, Jr.
Assistant Examiner—Alan D. Diamond
Attorney, Agent, or Firm—Keil & Weinkauf

[57] ABSTRACT

Novel alkoxylated polyetherdiamines are useful as gasoline additives, for keeping carburetors and valves clean, and as lubricant additives.

3 Claims, No Drawings

ALKOXYLATED POLYETHERDIAMINES PREPARATION THEREOF, AND GASOLINES CONTAINING SAME

The present invention relates to novel ethoxylated, propoxylated or butoxylated polyetherdiamines and to gasolines containing small amounts thereof.

The carburetors and inlet systems of gasoline engines as well as the fuel injection systems of gasoline and diesel engines are increasingly exposed to contamination due to dust particles from the air, unburnt hydrocarbon residues from the combustion chamber, and the crankshaft housing vent gases which are passed into the carburetor.

These residues alter the air-fuel ratio at idling speed and at the lower end of the load-carrying capacity so that the mixture becomes richer, the combustion becomes less complete and in turn the proportion of unburnt or incompletely combusted hydrocarbons in the exhaust gas increases, and the fuel consumption rises.

It is known that to avoid these disadvantages fuel additives are used for keeping valves and carburetors or injection systems clean (cf. for example M. Rossenbeck in Katalysatoren, Tenside, Nineraloladditive, eds. J. Falbe, U. Hasserodt, p. 223 et seq., G. Thieme Verlag, Stuttgart 1978).

Today there are two generations of such detergent type additives, distinguished not only according to their mechanism of action but also according to their preferred site of action.

The first generation of detergent type additives was only able to prevent the formation of deposits in the manifold system but not able to remove existing deposits in the manifold system, whereas the modern additives of the second generation are able to do both, having both a keep-clean and a clean-up effect, and this, by virtue of improved thermal properties, particular also in high temperatures zones, especially at the inlet valves.

A further requirement is that the fuel additives, which pass at a low rate but continuously from the combustion chamber into the lubricant cycle of an engine, should ideally have a positive effect on the lubricant.

In general, motor fuel detergents are constructed by combining polar structures with usually high molecular weight a polar or lipohilic moieties.

Representatives of the second additive generation are for example products having polyisobutenes in the a polar moiety, with additives of the polyisobutylamine type having particularly good properties.

Products of this type usually perform well in valve and carburetor detergency, but they have at most a neutral—nonadverse—effect on an engine lubricant, ie. they no not have any positive effect in respect of sludge dispersal.

On the other hand, dispersants are usually prepared via routes which require organic chlorine compounds at one stage.

A no-chlorine alternative is hydrofomylation followed by secondary reactions on polyisobutenes.

Hydrofromylation produces a carbonyl or alcohol function on an olefinic starting material, depending on the chosen conditions.

Polyglycol derivatives naturally have terminal alcohol functionalities.

It is an object of the present invention to convert suitable polygylcols or derivatives thereof into effective products.

We have found that this object is achieved by alkoxylated polyetherdiamines of the formula I

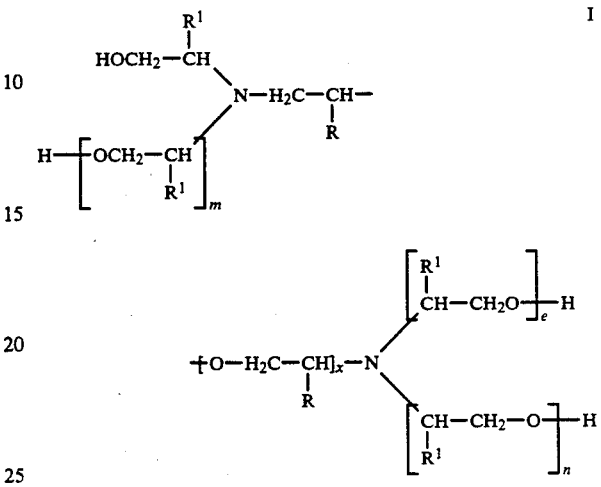

where R and $R^1$ are each independently of the other hydrogen, methyl or ethyl, e, m and n are each 0 or 1, and x is from 10 or 50, preference being given to those where R and $R^1$ are each hydrogen or methyl.

The novel alkoxylated polyetherdiamines are obtained by subjecting a polyglycol for the formula II

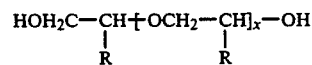

to a reductive animation and an alkoxylation with from 1 to 5 mol of ethylene oxide, propylene oxide or butylene oxide.

The polyglycol (II) used, which is preferably a polypropyl glycol, has a molecular weight within the range of 500 to 5000, preferably within the range from 800 to 2500. It is obtained in a conventional manner by base-catalyzed polymerization of alkoxides, in particular propylene oxide. The terminal hydroxyl groups are then reductively animated to the diamine in a conventional manner, as described for example in DE-A-3 611 230, which is herewith incorporated herein by reference.

The mono-, di-, tri- or tetraalkoxylation is effected by reacting the diamine with an alkylene oxide, preferably ethylene oxide or propylene oxide, in a conventional manner, for example by reacting the amine in the presence of a certain proportion of water in a pressure vessel with approximately 1-5 times the molar amount of alkylene oxide, as described for example by S. P. McManus et. al., Synth. Commun. 3, (1973), 177. Depending on the amount of alkoxide used, monoalkoxylated, dialkoxylated, trialkoxylated or tetraalkoxylated amines are obtained.

Surprisingly, the alkoxylation products of the formula I have very good valve-cleaning properties, while the nonalkoxylated starting amines are ineffective in this respect. Suitable amount are from 50 to 5000 ppm of the compound of formula I in the OPPENLAENDER et. al., U.S. Ser. No. 07/801,214 gasoline composition.

Suitable motor gasolines are leaded and unleaded regular and premium grades. The gasolines may also contain other components as hydrocarbons, eg. alcohols such as methanol, ethanol and tert-butanol or ethers, eg. methyl tert-butyl ether. In addition to the alkoxylated polyetherdiamines to be used according to the present invention the motor fuels generally contain further additives such as corrosion inhibitors, stabilizers, antioxidants and/or further detergents.

Corrosion inhibitors are usually ammonium salts of organic carboxylic acids which by virture of the structure of the starting compounds tend to be film-forming. Amines for reducing the pH are frequently also used as corrosion inhibitors. The corrosion inhibitors for non-ferrous metals are usually heterocyclic aromatics.

Suitable antioxidants or stabilizer are in particular amines such as para-phenylenediamine, dicylohexylamine, morpholine or derivatives of these amines. Other motor fuel and lubricant addicites are phenolic antioxidants such as 2,4-di-tert-butylphenol or 3,4,5-di-tert-butyl-4-hydroxyphenylpripionic acid and derivatives thereof.

Motor fuels may further contain, as further carburetor, injector and valve detergents, amides and imides of polyisobutylenesuccinic anhydride, polybutenepolyamines and long-chain carboxamides and -imides.

The products were tested in respect of their suitability for use as motor fuel additives in an engine test.

Test method CEC-F-02-T-79 was used to test their effectiveness as valve detergents.

EXAMPLES

(a) Ethoxylation of polyetherdiamine 400 mg (about 0.2 mol) of a polyetherdiamine prepared from propylene glycol having an average molecular weight of about 2000 are introduced into a V$_2$A stirred autoclave together with 20 ml of water (about 5% by weight, based on the batch).

22 g (0.5 mol) of ethylene oxide gas are introduced at an internal temperature of from 90° to 100° C. and a maximum pressure of 6 bar over 30 minutes. After the addition is complete, the mixture is subsequently stirred for 3 hours.

Volatiles are then removed under reduced pressure as completely as possible, and the alkoxylate is isolated as a viscous plate yellow oil.

400 g (about 0.2 mol) of polyetherdiamine prepared from propylene glycol having an average molecular weight of about 2000 are introduced into a V$_2$A stirred autoclave together with 20 ml of water (about 5% by weight, based on the batch).

29 g (0.5 mol) of propylene oxide gas are introduced at an internal temperature of from 110° to a 120° C. and a maximum pressure of 6 bar over 30 minutes. After the addition is complete, the mixture is subsequently stirred for 3 hours.

Volatiles are then removed under reduced pressure as completely as possible and the alkoxylate is isolated as a viscous pale yellow oil.

(c) Butoxylation of polyetherdiamine 400 g (about 0.2 mol) of polyetherdiamine prepared from propylene glycol having an average molecular weight of about 2000 are introduced into a V$_2$A stirred autoclave together with 20 ml of water (about 5% by weight, based on the batch).

33 g (0.45 mol) of butylene oxide gas are introduced at an internal temperature of from 120° to 130° C. and a maximum pressure of 6 bar over 30 minutes. After the addition is complete, the mixture is subsequently stirred for 3 hours.

Volatiles are then removed under reduced pressure as completely as possible and the alkoxylate is isolated as a viscous plate yellow oil.

(d) Results of engine tests

| | Test for usefulness as valve detergent | | | |
| --- | --- | --- | --- | --- |
| | Deposits [mg]* Valve No. | | | |
| Product | 1 | 2 | 3 | 4 |
| Polyisobutylamine as per DE-A1-3 611 230 | 15 | 0 | 0 | 10 |
| Ethoxylated polyetheramine as per (a) | 40 | 0 | 6 | 0 |
| Propoxylated polyetheramine as per (b) | 12 | 1 | 0 | 6 |
| Butoxylated polyether amine as per (c) | 41 | 0 | 3 | 9 |
| Starting polyetheramine for (a)–(c) | 259 | 190 | 800 | 95 |

*according to CEC-F-02-T-79

We claim:

1. A fuel composition for gasoline engines, comprising gasoline and a valve-cleaning effective amount of at least one alkoxylated polyetherdiamine of the formula I:

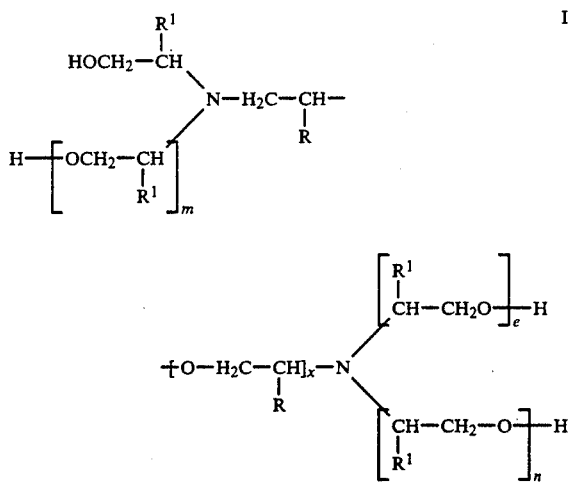

where R and R' are each independently of the other hydrogen, methyl or ethyl; e, m and n are each 0 or 1: and x is from 10 to 50.

2. The fuel composition of claim 1, wherein R and R' are each hydrogen or methyl.

3. The fuel composition of claim 1, containing 50 to 5000 ppm of least one compound of formula I, where R' is hydrogen or methyl.

* * * * *